(12) United States Patent
Sano

(10) Patent No.: US 6,481,387 B1
(45) Date of Patent: Nov. 19, 2002

(54) COOLING CONTROLLER FOR INTERNAL-COMBUSTION ENGINE

(75) Inventor: Mitsuhiro Sano, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 09/787,026

(22) PCT Filed: Aug. 5, 1999

(86) PCT No.: PCT/IB99/01482

§ 371 (c)(1),
(2), (4) Date: Mar. 13, 2001

(87) PCT Pub. No.: WO01/11211

PCT Pub. Date: Feb. 15, 2001

(51) Int. Cl.$^7$ .................................................. F01P 7/14
(52) U.S. Cl. ..................................................... 123/41.1
(58) Field of Search ............................ 123/41.44, 41.1, 123/41.12, 41.15; 62/323.1

(56) References Cited

U.S. PATENT DOCUMENTS

| | | | |
|---|---|---|---|
| 3,070,975 A | | 1/1963 | Cornelius |
| 4,399,774 A | | 8/1983 | Tsutsumi |
| 4,531,379 A | * | 7/1985 | Diefenthaler, Jr. ....... 123/41.06 |
| 5,036,803 A | * | 8/1991 | Nolting et al. ............. 123/41.1 |
| 5,692,460 A | * | 12/1997 | Froeschl et al. ........... 123/41.1 |
| 5,724,941 A | * | 3/1998 | Suzuki et al. ............. 123/41.15 |
| 5,730,089 A | * | 3/1998 | Morikawa et al. ....... 123/41.33 |

FOREIGN PATENT DOCUMENTS

| | | |
|---|---|---|
| EP | 0-293-334 | 11/1988 |
| JP | 60-256513 | 12/1985 |
| JP | 63-170520 | 7/1988 |

* cited by examiner

*Primary Examiner*—Gene Mancene
*Assistant Examiner*—Hyder Ali
(74) *Attorney, Agent, or Firm*—Sughrue Mion, PLLC

(57) ABSTRACT

The present invention relates to a cooling controller for cooling an internal-combustion engine such as an internal-combustion engine for an automobile, comprising a temperature detector for detecting the temperature of the cooling medium placed in a first or second circulation channel, and a flow control for controlling the flow of the cooling medium placed in the first or second circulation channel.

The first circulation channel passes through the engine and the radiator as in a conventional cooling system. The second circulation channel, which is used in case of a detected failure of the radiator or thermostat valve, includes the heat exchanger of the automobile's air-conditioning system. When the failure is detected an air conditioner controller maximizes the amount of heat radiated from the air conditioning exchanger to prevent overheating.

8 Claims, 7 Drawing Sheets

COOLING CONTROLLER FOR INTERNAL-COMBUSTION ENGINE

FIELD OF THE INVENTION

The present invention relates to a cooling controller for cooling an internal-combustion engine such as an internal-combustion engine for an automobile, and particularly to a cooling controller for an internal-combustion engine that can prevent an internal-combustion engine from overheating in the case where the thermostat or other parts may fail.

BACKGROUND OF THE INVENTION

In an internal-combustion engine (hereinafter abbreviated as "engine") for use in an automobile, a water-cooled type cooling device using a heat exchanger (hereinafter referred to as "radiator") for cooling the engine has been utilized. In such a cooling device, a thermostat is utilized as a cooling control means to control the temperature of the cooling water. If the temperature of the cooling water is lower than a designated temperature, the thermostat is closed so the cooling water circulates within a bypass route, not through the radiator. If the cooling water becomes higher than a designated temperature, the thermostat is opened and the cooling water circulates within the radiator.

The conventional cooling controller for an internal-combustion engine is shown in FIG. 7. In the cooling controller 100 for an internal-combustion engine in this figure, a fluid passage shown by the arrow is formed within an engine E composed of a cylinder head 101a and a cylinder block 101b. Further, a cooling water channel 102 for circulating the cooling water is placed between the engine E and radiator R.

The cooling water channel 102 is composed of a cooling water channel 102a connecting an outlet for the cooling water provided at an upper portion of the engine E with an inlet of the radiator R, a cooling water channel 102b provided from an outlet of the radiator R to an inlet for the cooling water provided at a lower portion of the engine E, and a bypass channel 103 which connects the cooling water channel 102a at the outlet side to the cooling water channel 102b at the inlet side. A thermostat 104 is placed on a branch portion between the cooling water channel 102a at the outlet side and the bypass channel 103. The thermostat 104 embeds a heat responding element, which expands or shrinks due to changes in the heat, like a wax does. When the temperature of the cooling water is high, the valve is opened by the expansion of the heat responding element to allow the cooling water flowing from the engine E to enter into the radiator R via the cooling water channel 102a at the side of the outlet, and the cooling water having a low temperature due to the heat radiation by the radiator R passes through the bypass channel 103 to flow into the cooling channel within the engine E from the inlet of the engine E.

When the temperature of the cooling water is low, the valve of the thermostat 104 is closed due to the shrinkage of the heat responding element, and the cooling water flowing from the outlet of engine E passes through the bypass channel 103 to enter from the inlet of the engine E into the cooling channel within the engine E.

A water pump WP is placed at the inlet of the engine E, and by the rotation of a crankshaft (not shown) of the engine E, the rotation shaft of the pump is rotated, forcing the cooling water to be circulated. In addition, the radiator R is provided with a cooling fan 105 for forcible intake of the cooling air, and is composed of a cooling fan 105 and a fan motor 106 for rotating the cooling fan 105.

The conventional cooling device described above has the following problems: when the fan motor 106 of the cooling fan 105 in the radiator R has a problem, or any problem occurs in the thermostat 104 such as the valve being left closed so the cooling water does not circulate into the radiator R, the cooling water is not cooled. Consequently, the engine E attains a state of overheating.

A cooling controller for an internal-combustion engine according to the present invention has been made in light of the above situation, and provides a system which can prevent problems such as overheating, even if the radiator or the thermostat has failed and which can exhibit fail-safe functions.

SUMMARY OF THE INVENTION

A cooling controller for a internal-combustion engine according to the present invention which solves the problems described above, includes:

a first heat exchanger configured by forming a circulation channel for a cooling medium between an internal-combustion engine and a heat exchanger to radiate out heat generated in the internal-combustion engine through circulation of the cooling medium, and a second heat exchanger which radiates out heat by forming a second circulation channel for air conditioning an automobile cabin, the cooling controller further comprising:

a temperature detecting means to detect the temperature of said cooling medium, wherein the temperature detecting means is placed in at least one of said first or second circulation channels, a flow amount control means to control the flow amount of said cooling medium, a driving condition detecting means for said internal-combustion engine, an internal-combustion engine control means to control said internal-combustion engine based on the output signal from said driving condition detecting means, an air conditioner for air conditioning the automobile cabin utilizing the heat radiation of said second heat exchanging system, an air conditioner control means to control said air conditioner, and said air conditioner control means outputting an operating signal which maximizes an amount of heat radiated from said second heat exchanger for air conditioning when an abnormality of the cooling function of said internal-combustion engine is detected by said input signal from said internal-combustion engine control means.

A cooling controller having such a configuration can allow the cooling medium to cool down through the second heat exchanger, even if said first heat exchanger or said flow amount control means is defective and does not allow the cooling medium to cool down, making it possible to take precautions against serious problems such as overheating.

Furthermore, said flow amount control means is preferably characterized by opening or closing the thermostat valve through an input signal from said internal-combustion engine control means.

The flow amount control means can carefully control the angle of the valve and, thus, the flow amount in said first circulation channel can be controlled with high reliability.

The present invention also relates to a cooling controller for an internal-combustion engine comprising:

a first heat exchanger configured by forming a circulation channel for a cooling medium between an internal-combustion engine and a heat exchanger to radiate out heat generated in the internal-combustion engine through circulation of the cooling medium, and a second heat exchanger which radiates out heat by forming a second circulation channel for air-conditioning an automobile cabin, which cooling controller further comprises:

a temperature detecting means to detect the temperature of said cooling medium, wherein the temperature detecting means is placed in at least one of said first or second circulation channels, a flow amount control means to control the flow of said cooling medium, an air conditioner for air conditioning the automobile cabin having said second heat exchanger and carrying out air conditioning utilizing the cooling medium of said internal-combustion engine, an air conditioner control means to control said air conditioner, and said air conditioner control means outputting an operating signal which maximizes an amount of heat radiated out from said second heat exchanger when the input signal from said temperature detecting means is higher than a designated temperature.

The flow amount control means is preferably a thermostat which opens or closes a valve by means of a thermal expansion means embedded in a casing.

A cooling controller for an internal-combustion engine having such a configuration has a relatively simple configuration, and can automatically open or close the circulation channel of said cooling medium.

Descriptions of parts which are the same as those of the conventional device are omitted.

DETAILED DESCRIPTION OF THE PREFERRED EMBODIMENTS

A cooling controller for an internal-combustion engine according to a first embodiment of the present invention will now be described by referring to FIGS. 1 to 3.

Figure 1:
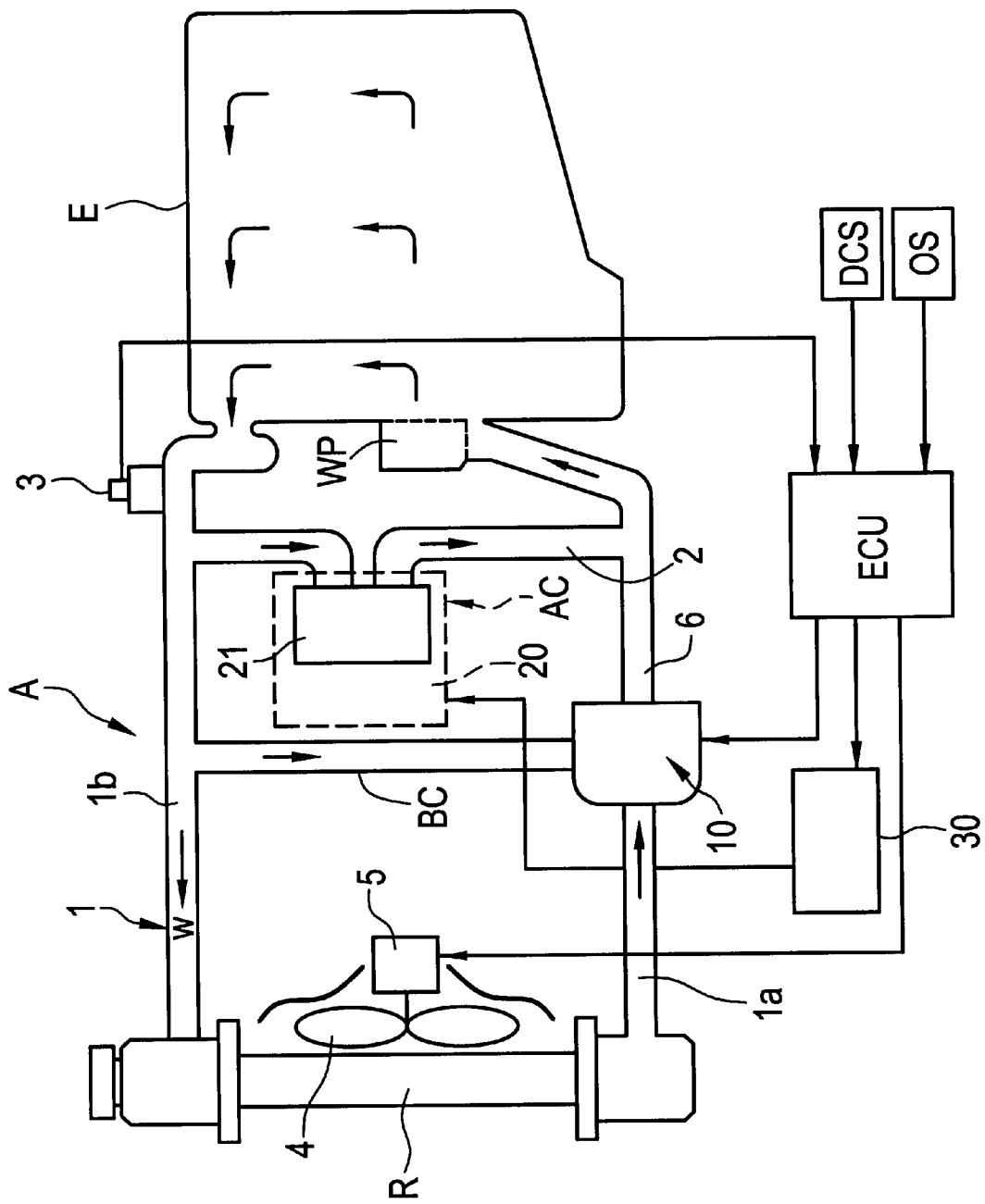
FIG. 1 is a drawing showing a cooling controller for an internal-combustion engine according to a first embodiment of the present invention.

In a cooling controller A for an internal-combustion engine shown in FIG. 1, a first circulation channel 1 for cooling fluid W, which is a cooling medium, is formed between a fluid channel formed in an engine E, which is an internal-combustion engine, and a fluid channel formed in a radiator R, which is a heat exchanger. By circulating the cooling fluid W in the first circulation channel, heat generated in the engine E is radiated out through the radiator R. Further, a second circulation channel 2, which is branched off the first circulation channel 1, is formed, and a heater core 21, which is a second heat exchanger and which is used for air conditioning of an automobile cabin, is provided in the circulation channel 2. It will be understood that the type of air conditioning of an automobile cabin provided by the second heat exchanger is heating. A bypass channel BC is also provided to allow cooling fluid W to flow in the first circulation channel 1 while bypassing the radiator R.

A cooling fluid temperature sensor 3, which detects the temperature of the cooling fluid W, and which is a temperature detecting means, is placed adjacent to the portion connecting the engine E to the first or second circulation channel. The cooling fluid temperature sensor 3 detects the fluid temperature by the use, e.g., of a thermistor, etc., and the temperature detected by the cooling fluid temperature sensor 3 is converted into an electrical output signal and is output to the engine control unit ECU, which is the internal-combustion engine control means.

At the channel portion between the channel branch 6 of the first circulation channel 1, the bypass channel BC, and the channel branch 6 leading to the fluid pump WP, a thermostatic valve 10 is provided as a variable flow control means which controls the flow of the cooling fluid W. The thermostatic valve 10 controls the flow degree of the cooling fluid W by opening or closing an internal valve through an electric control, as described more fully later on. The opening and closing of the valve is controlled by the engine control unit ECU.

At the connecting portion of the inlet 1a of the first circulation channel 1 to the engine E, a fluid pump WP for circulating the cooling fluid W is provided. The fluid pump WP is a gear pump driven by the engine E, and cools the engine E by passing the cooling fluid W through a fluid channel formed within the engine E, and circulates the cooling fluid W into the fluid channel of the radiator R via an output 1b of the circulation channel 1. The cooling fluid W circulated into the radiator R is cooled down by cooling air, which is suctioned by the radiator fan 4, and the cooling fluid W having been cooled is transferred to the engine E via the inlet 1a of the first circulation channel 1. The radiator fan 4 is an electric fan which is driven by a motor 5, and the flow amount of air and ON-OFF switching are controlled depending upon the temperature of the cooling fluid W. The control is carried out by the engine control unit ECU based on the temperature of the cooling fluid W detected by the cooling fluid temperature sensor 3.

Figure 2:
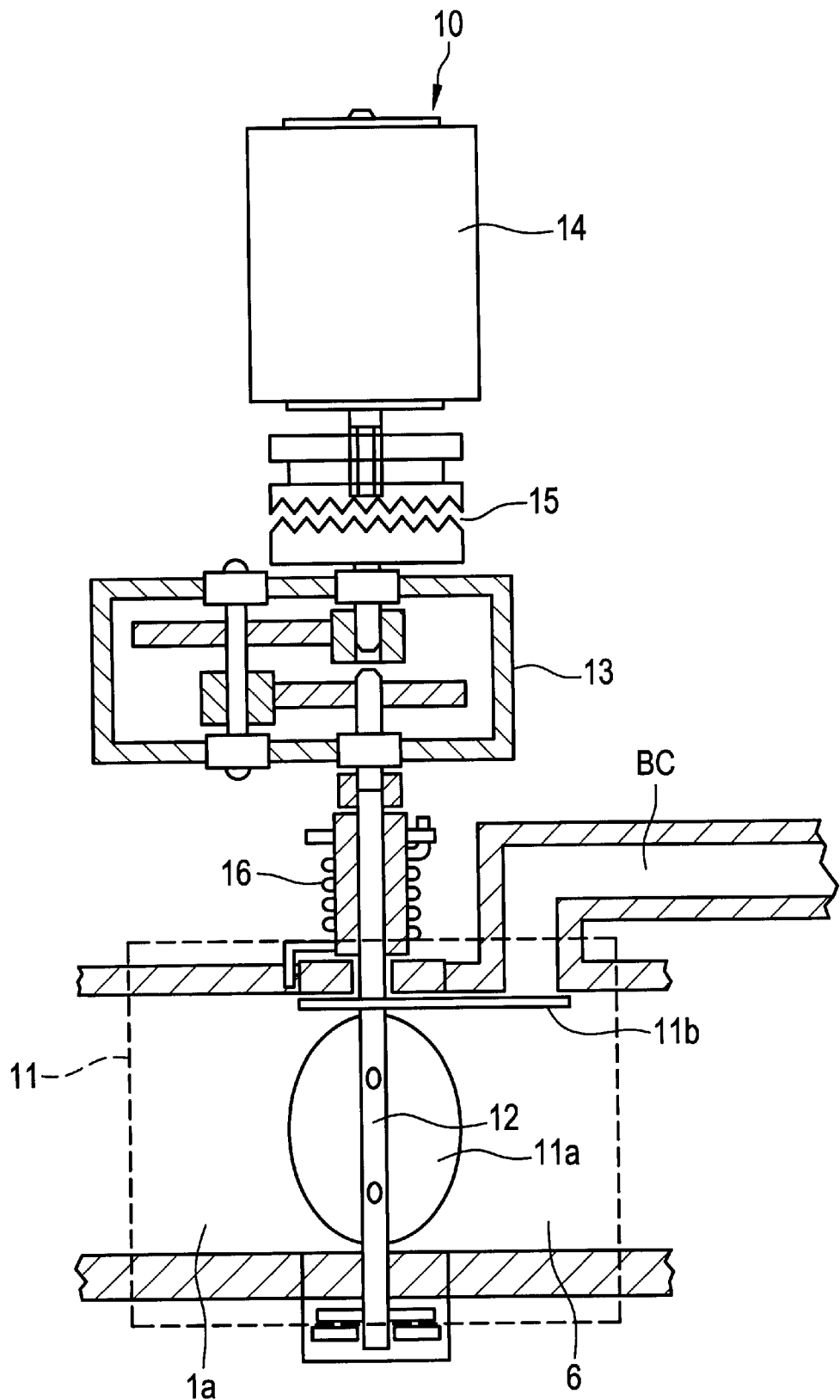
FIG. 2 is a cross-sectional view showing a thermostatic valve for use in the cooling controller of FIG. 1.
Figure 3:
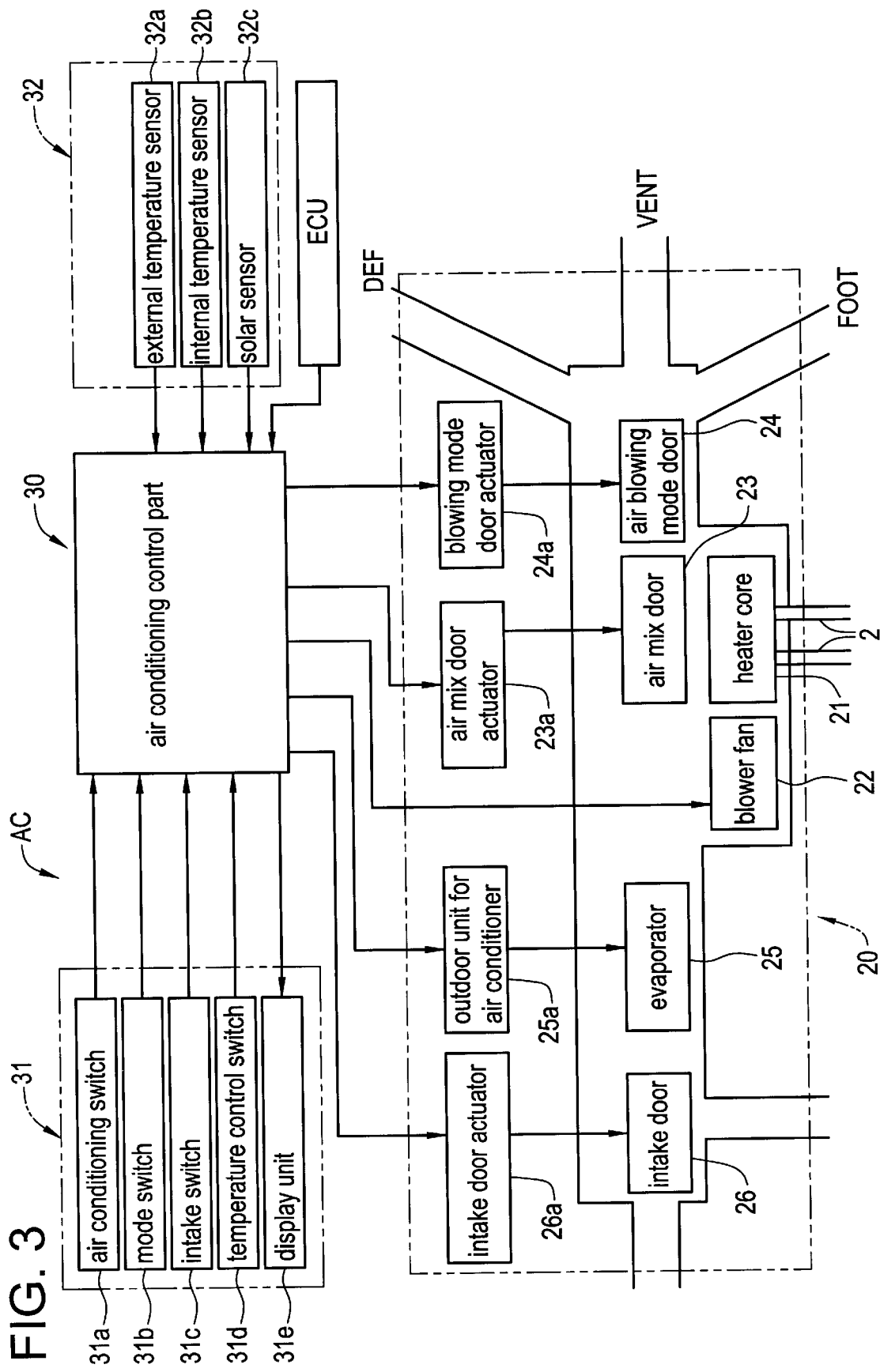
FIG. 3 is a drawing showing an air conditioner for use in the cooling controller of FIG. 1.

As shown in FIG. 2, the thermostatic valve 10 to be used in the cooling controller A for an internal-combustion engine is configured so that a valve body having a 3-way configured valve 11, having vanes 11a and 11b, is placed between the inlet 1a, the bypass channel BC, and the channel branch 6 leading to the fluid pump WP, and the shaft 12 of the 3-way configured valve 11 is driven by a drive motor 14 via a deceleration mechanism 13 to open or close the 3-way configured valve 11. In the embodiment shown in FIG. 2, vane 11a opens to allow flow from inlet 1a to channel branch 6 as vane 11b closes to cut off flow from bypass channel BC to channel branch 6, and vice versa. Between the deceleration mechanism 13 and the drive motor 14, an electronic clutch 15 is placed so as to break off the rotation of the drive motor 14. Between the valve body and the deceleration mechanism 13, a return spring 16 is equipped to apply a resilient force against the 3-way configured valve 11 in a direction so that the 3-way configured valve 11 returns to a fail-safe normal position.

The thermostatic valve 10 configured as described above is controlled by the engine control unit ECU, so that when the temperature of the cooling fluid W is less than a designated temperature, the valve is maintained in a position that bypasses the radiator R, and when it is higher than a designated temperature, the valve is positioned at an adequate angle depending upon the cooling fluid temperature to allow a variable flow of cooling fluid W through the radiator R.

The engine control unit ECU, which controls the thermostatic valve 10 and the radiator R as well as the driving state on the whole, and which includes a microcomputer, keeps the driving conditions of the engine E under control by inputting data on the rotation speed of the Engine E, the degree of opening of the throttle, and other parameters through various driving condition sensors DCS, the cooling fluid temperature sensor 3, as well as other sensors OS, and outputs a control signal to each of the control devices to maintain the most ideal driving conditions.

An air conditioner AC which controls a heater core 21, which is the second heat exchanger, based on an output signal from the engine control unit ECU will now be described by referring to FIG. 3. In this figure, the air conditioner AC is composed of the body 20 of the device and a control part 30 for controlling air conditioning, which controls the body 20 of the device.

In the body 20 of the device, the heater core 21 is placed in the circulation channel 2, and heat exchange is carried out by passing the cooling fluid W through the heater core 21. For this reason, a blower fan 22 is placed at the heater core 21, and by controlling the speed of the blower fan 22, the amount of heat radiated out can be controlled.

An air mix door 23 is also placed on the body 20 of the device for the purpose of mixing the hot air transferred from the heater core 21 with the cooling fluid W for controlling the temperature. The air mix door 23 actuates to a given position according to the set temperature by means of an air mix door actuator 23a based on control by the control part 30 for controlling the air conditioning. Further, an air blowing mode door 24 switches the air, controlled to a designated temperature at the air mix door 23, into an air blowing mode such as DEF, VENT, or FOOT, and is actuated by means of an air blowing mode actuator 24a through control by control part 30 for controlling the air conditioning.

The body 20 of the device further possesses an evaporator 25 for forming cooling air for air conditioning. The evaporator 25 is driven by an outdoor unit 25a for the air conditioner through a control signal of the control part 30.

Also, an intake door 26 for switching intake of the air from inside or outside of the automobile cabin is placed on the body 20 of the device. The intake door 26 has a configuration so as to be actuated by means of an intake door actuator 26a based on a control signal from control part 30.

The control part 30 has a microcomputer etc., and drives the body 20 of the device according to an input signal input from an operation panel 31 placed on a dashboard, etc., in the automobile cabin. On the operation panel 31 are placed an air conditioning switch 31a, which turns the air conditioner AC ON or OFF, a mode switch 31b which switches the air-blowing mode to DEF, VENT, or FOOT, an intake switch 31c which switches intake of the air from inside or outside of the automobile cabin, a temperature control switch 31d, which controls the set temperature, and a display unit 31e for displaying the contents set by these switches. Further, the control part 30 controls the blower fan 22, the air mix door 23, the air-blowing mode door 24, the intake door 26, etc., to desired operating points by comparing the conditions set at the operation panel 31 with the present temperature input from various temperature sensors 32, such as the external atmospheric temperature sensor 32a, the internal atmospheric temperature sensor 32b, and the solar sensor 32c.

Further, the control part 30 is configured so as to input the output signal from the engine control unit ECU. The output signal from the engine control unit ECU is configured so that it is output when any defect of the radiator fan 4 or the thermostatic valve 10 shown in FIG. 1 occurs, making the cooling fluid temperature at the cooling fluid temperature sensor 3 abnormal. In control part 30, when an abnormal signal is input from the engine control unit ECU, the blower fan 22 rotates at the maximum speed to maximize the heat radiation from the heater core 21. The control part 30 is configured so that when an abnormal signal is input from the engine control unit ECU, the occurrence of abnormality appears on the display unit 31e of the display panel 31.

The cooling controller A configured as described above makes it possible to cool the cooling fluid W by radiating out heat through the heater core 21, even if the radiator fan 4 or the thermostatic valve 10 has a problem. Furthermore, a driver can deal with the abnormality in an adequate manner based on the display of the occurrence of the abnormality on the display unit 31e, thereby preventing problems ahead of time.

A cooling controller for an internal-combustion engine according to a second embodiment of the present invention will now be described by referring to FIGS. 4 to 6. Parts which are the same as those of the cooling controller A are represented by the same symbols.

Figure 4:
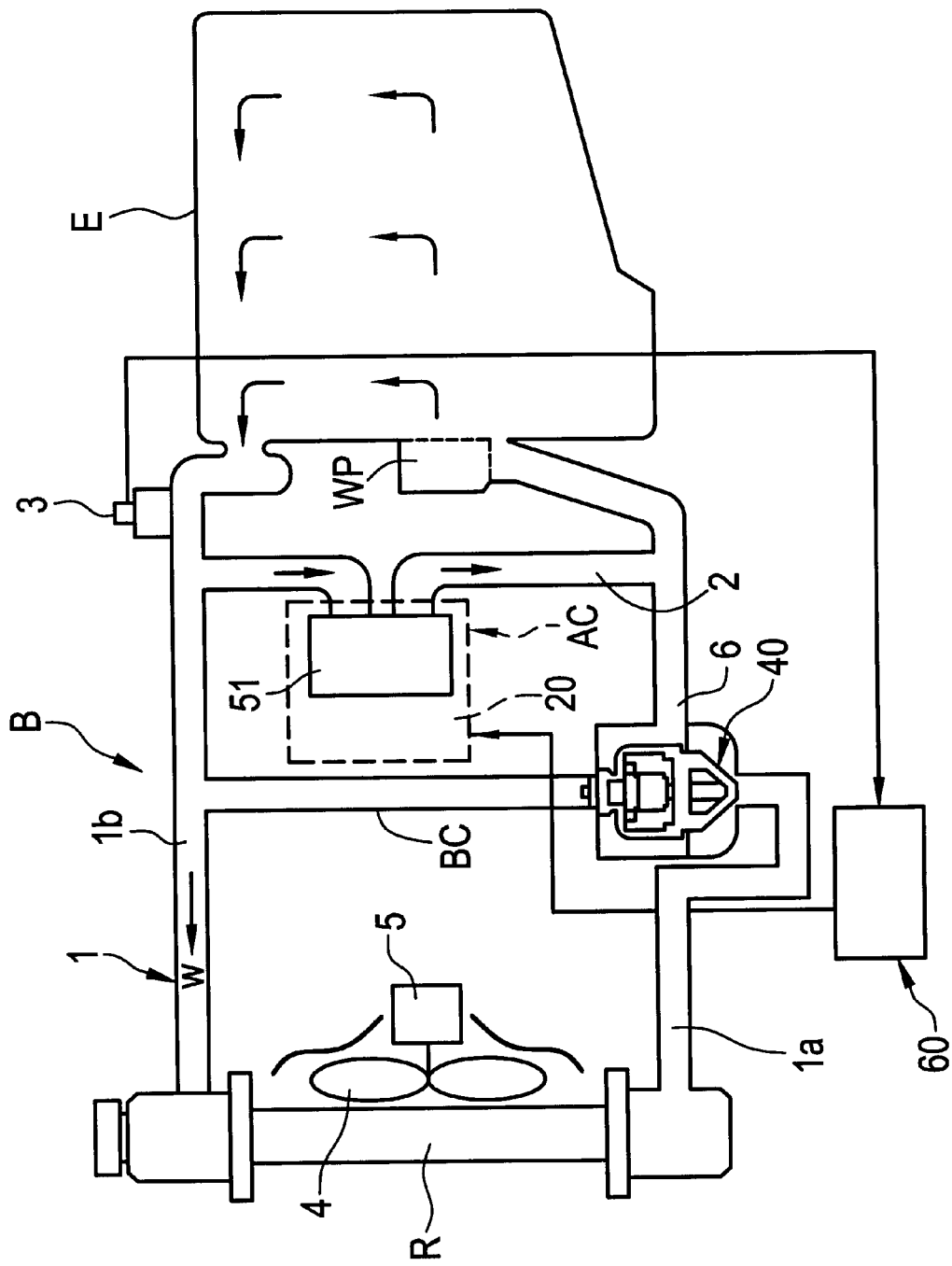
FIG. 4 is a drawing showing a cooling controller for an internal-combustion engine according to a second embodiment of the present invention.

In a cooling controller B for an internal-combustion engine shown in FIG. 4, a first circulation channel 1 for cooling fluid W, which is a cooling medium, is formed between a fluid channel formed in an engine E, which is an internal-combustion engine, and a fluid channel formed in a radiator R, which is a heat exchanger. By circulating the cooling fluid W in the first circulation channel, heat generated in the engine E is radiated through the radiator R. Further, a second circulation channel 2 which is branched off the first circulation channel 1, is formed, and a heater core 51, which is a second heat exchanger and which is used for air conditioning an automobile cabin, is provided in the circulation channel 2 for air conditioning. A bypass channel BC is also provided to allow cooling fluid W to flow in the first circulation channel 1 while bypassing the radiator R.

In cooling controller B a cooling fluid temperature sensor 3, which detects the temperature of the cooling fluid W, and which is a temperature detecting means is placed adjacent to the portion connecting the engine E to the first or second circulation channel. The cooling fluid temperature sensor 3 detects the cooling fluid temperature by the use of an, e.g., thermistor, etc., and the temperature detected by the cooling fluid temperature sensor 3 is converted into an electrical output signal and is output to the control part 60.

At the channel portion between the inlet 1a of the first circulation channel 1, the bypass channel BC and the channel branch 6 leading to the fluid pump WP, a thermostat 40 is provided as a variable flow control means which controls the flow of the cooling fluid W. The thermostat 40 includes a heat responding element 44 and opens or closes valves 42 and 48 depending on the cooling fluid temperature to control the flow amount of the cooling fluid W, as described later on.

At the connecting portion of the inlet 1a of the first circulation channel 1 to the engine E, a fluid pump WP for circulating cooling fluid W is provided. The fluid pump WP is a gear pump driven by the engine E, and cools the engine E by passing the cooling fluid W through a fluid channel formed within the engine E, and circulates the cooling fluid W into the fluid channel of the radiator R via an output 1b of the circulation channel 1. The cooling fluid W circulated into the radiator R is cooled down by cooling air, which is suctioned by the radiator fan 4, and the cooling fluid W having been cooled is transferred to the engine E via the inlet 1a of the first circulation channel 1. The radiator fan 4 is an electric fan which is driven by a motor 5, and the air amount is automatically controlled depending upon the temperature of the cooling fluid W.

Figure 5:
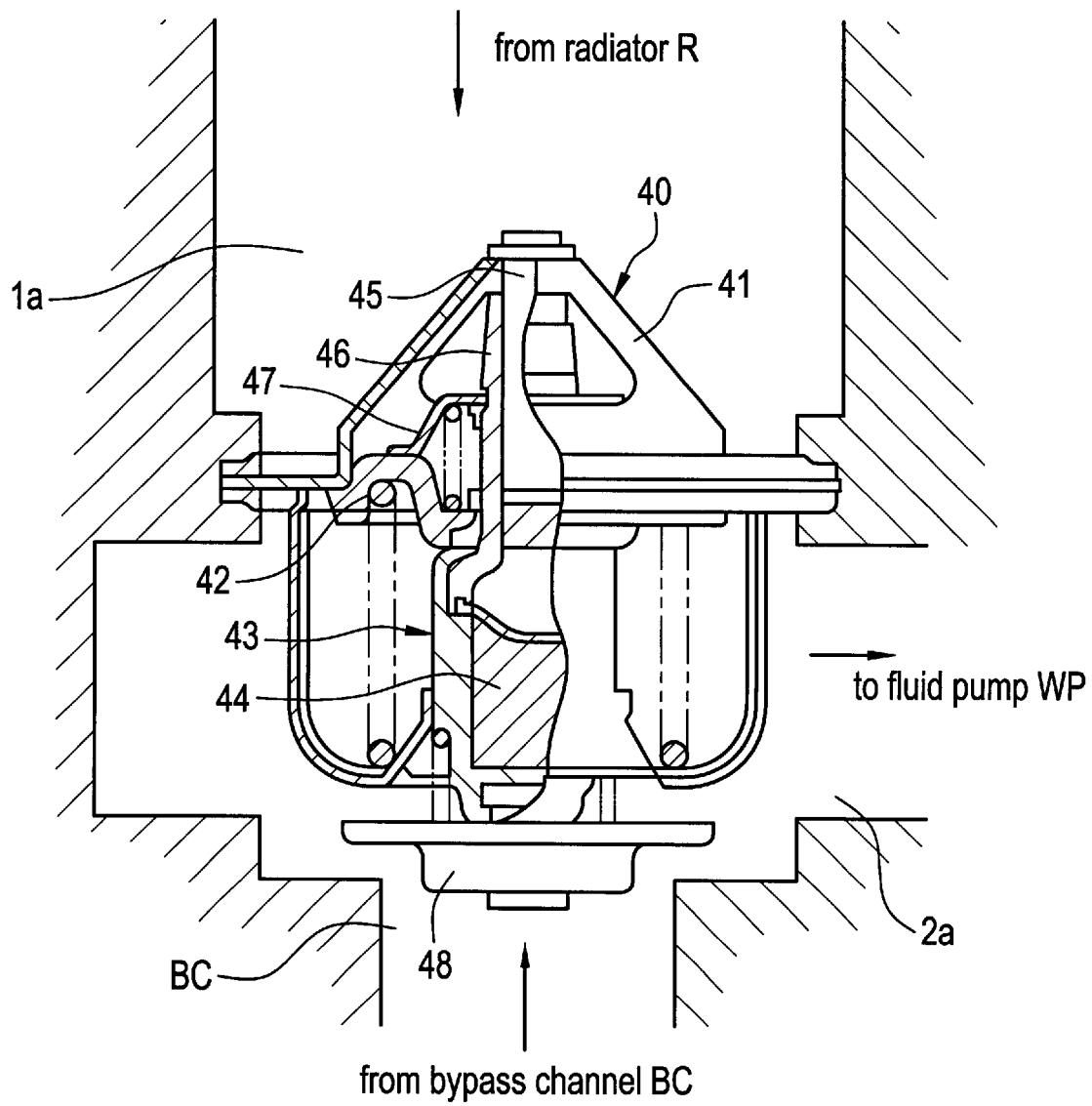
FIG. 5 is a cross-sectional view showing a thermostat for use in the cooling controller of FIG. 4.
Figure 6:
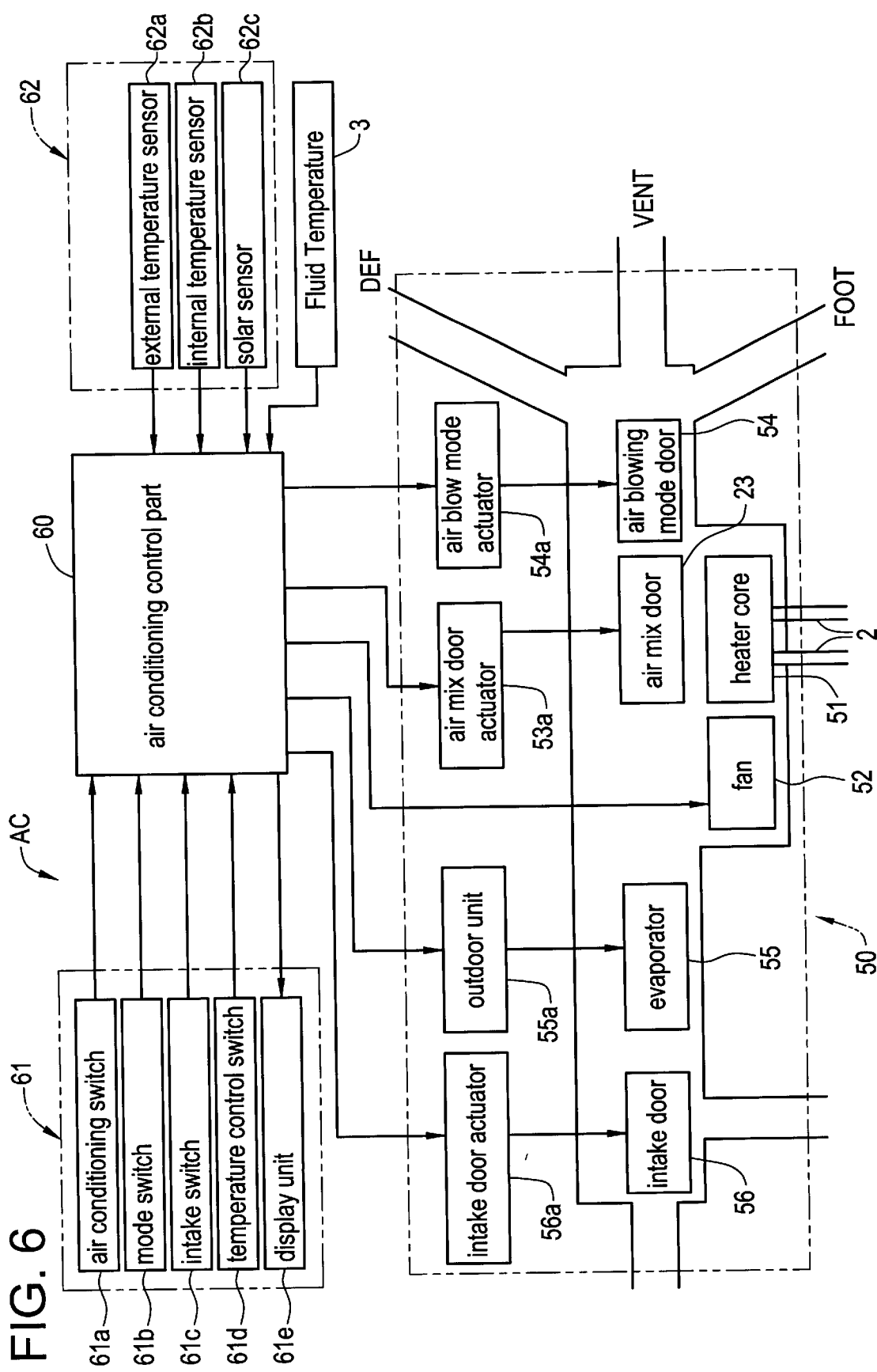
FIG. 6 is a drawing showing functions of an air conditioner control means for use in the cooling controller of FIG. 4.
Figure 7:
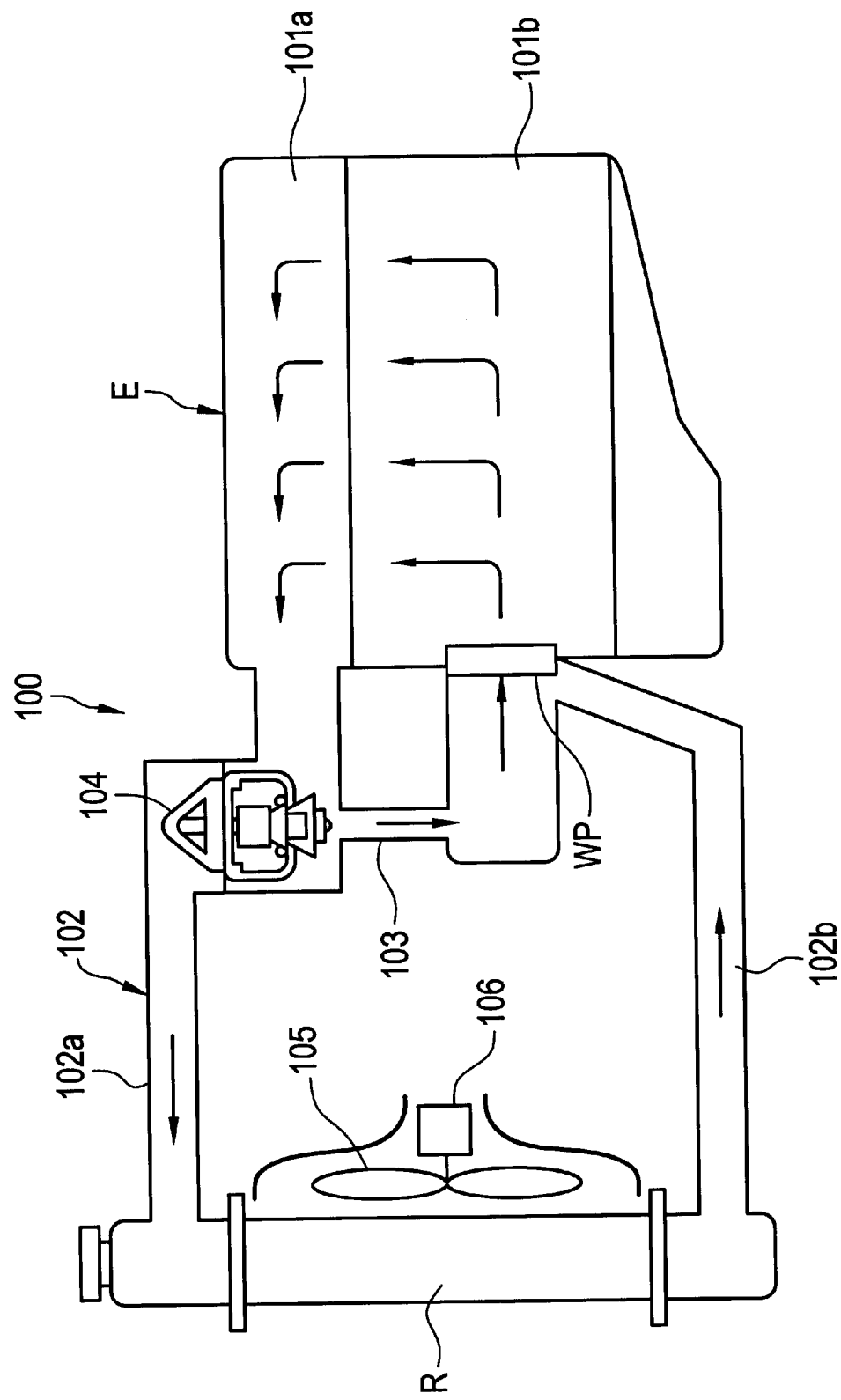
FIG. 7 is a drawing showing a cooling controller for an internal-combustion engine according to the prior art.

As shown in FIG. 5, the thermostat 40 which is used in the cooling controller B is placed at the channel portion between the first circulation channel 1, the bypass channel BC, and the channel branch 6 leading to the fluid pump WP. The movable valve 42 is placed within a frame 41 fixed on the wall of the circulation channel, and the valve 42 opens or closes the inlet 1a from the radiator R. The movable valve 48 is attached to a casing 46 of a thermo element 43 which is stored within the frame 41, and the valve 48 opens or closes the inlet from the bypass channel BC. When the heat responding element 44 embedded in the thermo element 43 pushes the valves 42 and 48 by heat expansion, the cooling fluid W is gradually allowed to pass through the radiator R, and is eventually substantially prevented from flowing through the bypass channel BC. Specifically, when the heat responding element 44 thermally expands, a piston rod 45 is pushed up, but since the end portion of the piston rod 45 is held by the frame 41, the casing 46 of the thermo element 43 is conversely pushed down. For this reason, a push plate 47 pushes the valve 42 down to make a gap between the valve 42 and the frame 41, and causes the valve 48 to seal off the inlet of the bypass channel BC. The cooling fluid W is then routed through the radiator and substantially prevented from flowing through the bypass channel BC.

The thermostat 40 configured as described above is set so as to keep the valve in a closed state with respect to the radiator R so cooling fluid W does not flow through the radiator R when the temperature of the cooling fluid W is less than a designated temperature, and to open the valve with respect to the radiator R so cooling fluid W does flow through the radiator R when the temperature of the cooling fluid W is higher than a designated temperature.

Next, an air conditioner AC will now be described by referring to FIG. 6. In this figure, the air conditioner AC is composed of the body 50 of the device and a control part 60 for controlling the air conditioning, which controls the body 50 of the device.

In the body 50 of the device, the heater core 51 is placed in the circulation channel 2, and heat exchange is carried out by passing the cooling fluid W through the heater core 51. For this reason, a blower fan 52 is placed on the heater core 51, and by controlling the speed of the blower fan 52, the amount of heat radiated out can be controlled.

An air mix door 53 is also placed on the body 50 of the device for the purpose of mixing the hot air transferred from the heater core 51 with the cooling fluid W for controlling the temperature. The air mix door 53 is actuated to a given position according to the set temperature by means of an air mix door actuator 53a, based on control by the control part 60. Further, an air blowing mode door 54 switches the air controlled to a designated temperature at the air mix door 53 into an air blowing mode such as DEF, VENT, or FOOT, and is actuated by means of an air blowing mode actuator 54a through control by control part 60 for controlling the air conditioning.

The body 50 of the device further possesses an evaporator 55 for forming cooling air for air conditioning. The evaporator 55 is driven by an outdoor unit 55a through a control signal of the control part 60.

Also, an intake door 56 for switching the intake of air from inside or outside of the automobile cabin is placed on the body 50 of the device. The intake door 56 has such a configuration so as to be actuated by means of an intake door actuator 56a based on a control signal from control part 60.

The control part 60 for controlling the air conditioning has a microcomputer etc., and drives the body 50 of the device according to an input signal input from an operation panel 61 placed on a dashboard, etc. in the automobile cabin. On the operation panel 61 are placed an air conditioning switch 61a, which turns the air conditioner AC ON or OFF, a mode switch 61b which switches the air-blowing mode to DEF, VENT, or FOOT, an intake switch 61c which switches intake of the air from inside or outside of the automobile cabin, a temperature control switch 61d, which controls the set temperature, and a display unit 61e for displaying the contents set by these switches. Further, the control part 60 controls the blower fan 52, the air mix door 53, the air-blowing mode door 54, the intake door 56, etc., to desired operating positions by comparing the conditions set at the operation panel 61 with the present temperature input from various temperature sensors 62, such as the external atmospheric temperature sensor 62a, the internal atmospheric temperature sensor 62b, and the solar sensor 62c.

Further, the control part 60 is configured so as to input the output signal from the cooling fluid temperature sensor 3. At the time of an abnormally high output from sensor 3, the microcomputer within the control part 60 causes the blower fan 52 to be rotated at the maximum speed to maximize the heat radiating out from the heater core 51. At this time, the occurrence of abnormality appears on the display unit 61e of the display panel 61.

The cooling controller B for an internal-combustion engine configured as described above makes it possible to cool the cooling fluid W by radiating out heat through the heater core 51, even if the radiator fan 4 or the thermostat 40 has failed. Furthermore, a driver can deal with the abnormality in an adequate manner based on the display of the occurrence of the abnormality on the display unit 61e of the operation display panel 61, thereby preventing problems such as overheating ahead of time.

When an abnormally high temperature of the cooling fluid W is detected by the cooling fluid temperature sensor 3, fail-safe can be more effectively carried out by the combination of maximum heat radiation measures such as by opening the intake door 56 for introducing external atmospheric air, driving the blower fan 56 at the maximum, stopping the outdoor unit 55a of the air conditioner, and allowing the maximum heat to radiate out of the heater core 51.

Thus, in the invention, when a defect occurs in the radiator or the thermostat in an automobile, etc., so that the cooling fluid cannot be cooled by the radiator, the cooling fluid can be cooled through a heater core of the air conditioner and, thus, problems with overheating can be avoided.

What is claimed is:

1. A cooling system for an internal-combustion engine comprising:

a first heat exchanger;

a first circulation channel for circulating a cooling medium between said internal-combustion engine and said first heat exchanger to radiate heat generated in said internal-combustion engine through circulation of said cooling medium;

a second heat exchanger;

a second circulation channel, wherein said second heat exchanger is located in said second circulation channel, and wherein said cooling medium flows through said second circulation channel;

a temperature detector for detecting the temperature of said cooling medium, wherein said temperature detector is placed in at least one of said first or second circulation channels;

a flow controller for controlling the flow of said cooling medium;

an internal-combustion engine control unit for controlling said internal-combustion engine;

an air conditioner for air conditioning said automobile cabin utilizing the heat radiation of said second heat exchanger; and an air conditioner controller for controlling said air conditioner;

wherein said air conditioner controller outputs an operating signal which maximizes an amount of heat radiated from said second heat exchanger when an abnormality of any driving condition of said internal-combustion engine relating to engine overheat is detected via an abnormality signal from said internal-combustion engine control unit.

2. The cooling system for an internal-combustion engine as claimed in claim 1, wherein said flow controller opens or closes a valve based on a flow control signal from said internal-combustion engine control unit to control the flow of said cooling medium.

3. The cooling system for an internal-combustion engine as claimed in claim 1, wherein said temperature detector is located substantially adjacent to said internal-combustion engine.

4. The cooling system for an internal-combustion engine as claimed in claim 1, wherein said first and second circulation channels share a cooling medium passage inside said internal-combustion engine.

5. The cooling system for an internal-combustion engine as claimed in claim 1, further comprising:

a cooling medium pump which circulates said cooling medium through said first and second circulation channels;

wherein said first circulation channel includes a bypass channel for bypassing said first heat exchanger;

wherein said first heat exchanger has an input channel portion and an output channel portion;

wherein said flow controller is a three-way configured flow control device, having a normally-open-when-cool port connected to said bypass channel, a normally-closed-when-cool port connected to one of said input and output channel portions of said first heat exchanger, and an always-open common port connected to a channel portion leading to said cooling medium pump;

wherein said flow controller is controlled to flow said cooling medium through said bypass channel when said temperature of said cooling medium is lower than a first designated temperature, and wherein said flow controller is controlled to flow said cooling medium through said first heat exchanger when said temperature of said cooling medium is higher than a second designated temperature.

6. The cooling system for an internal-combustion engine as claimed in claim 5, further comprising:

a fan for increasing heat dissipation from said first heat exchanger; and a fan controller for turning on said fan when said temperature of said cooling medium is higher than a third designated temperature.

7. The cooling system for an internal-combustion engine as claimed in claim 1, further comprising:

an air conditioning fan, wherein said air conditioner controller maximizes the flow of air by said air conditioning fan in order to maximize said amount of heat radiated from said second heat exchanger.

8. The cooling system for an internal-combustion engine as claimed in claim 1, further comprising:

a warning indicator, located in said automobile cabin, that displays a warning message when said abnormality of any driving condition of said internal-combustion engine relating to engine overheat is detected via said abnormality signal from said internal-combustion engine control unit.

* * * * *